United States Patent [19]

Baratoff

[11] 4,048,842
[45] Sept. 20, 1977

[54] SHOCK AND VIBRATION CONTROL SYSTEM FOR FORGING HAMMER

[75] Inventor: Paul Baratoff, Jackson Heights, N.Y.

[73] Assignee: Korfund Dynamics Corporation, Westbury, N.Y.

[21] Appl. No.: 734,586

[22] Filed: Oct. 21, 1976

[51] Int. Cl.² ............................................. B21J 13/04
[52] U.S. Cl. ...................................... 72/455; 72/465; 248/20
[58] Field of Search .................... 72/455, 465; 248/20, 248/21, 22, 358 R; 52/167

[56] References Cited
U.S. PATENT DOCUMENTS

| | | | |
|---|---|---|---|
| 2,319,735 | 5/1943 | Hussman | 248/20 |
| 2,466,480 | 4/1949 | Rosenzweig | 248/21 |
| 2,605,066 | 7/1952 | Brown | 248/20 |
| 2,823,882 | 2/1958 | Ross | 248/21 |
| 3,323,764 | 6/1967 | Johnson | 248/21 |
| 3,854,318 | 12/1974 | Korpeinen | 72/465 |
| 3,940,098 | 2/1976 | Takasaki | 248/20 |

Primary Examiner—C.W. Lanham
Assistant Examiner—Gene P. Crosby
Attorney, Agent, or Firm—Brumbaugh, Graves, Donohue & Raymond

[57] ABSTRACT

A forging hammer is isolated from a foundation by a shock and vibration control system composed of an inertia block and a multiplicity of shock-vibration isolators that are installed on pedestals spaced a dimension X below the bottom of the inertia block that is substantially equal to the sum of the loaded height H of an isolator and the height S of one or more permanent load-supporting spacers installed between the top of each isolator and the bottom of the inertia block. The height S of each spacer is greater than the sum of (1) the difference between the unloaded height and the loaded height of the isolator and (2) the minimum height of a jack suitable for loading the isolator in place so that the isolator can be inserted in position on the pedestal under the inertia block in unloaded condition and loaded using the jack and the spacer (or spacers) installed while the inertia block and forging hammer are temporarily supported on piers which include removable spacers that are taken out after the isolators are installed.

8 Claims, 10 Drawing Figures

SHOCK AND VIBRATION CONTROL SYSTEM FOR FORGING HAMMER

BACKGROUND OF THE INVENTION

The tremendous impacts involved in the operation of forging hammers can cause problems, the seriousness of which increases in accordance with the size of the hammer. With little or no vibration isolation, the impacts of large forging hammers can sometimes be felt over a mile away from the location of the hammers. Often, the shock of an improperly or unisolated forging hammer can crack building walls, damage other equipment in and around the facility where the hammer is located, creates an environmental nuisance, affects the accuracy of precision tools and instruments located at even substantial distances away and can actually pound the foundation on which the hammer is located down into the ground, making necessary frequent releveling.

Effective shock and vibration control systems for forging hammers have been known and widely used for many years. A good system will completely eliminate the transmission of shock between the hammer and the foundation and will, therefore, eliminate all of the problems referred to above. Moreover, a good shock and vibration system will make the operation of the hammer quieter and actually increase the efficiency of the hammer.

In some shock and vibration control systems proposed and used in the past, the vibration isolators and damping systems have often been installed outside of the perimeter of the inertia block to facilitate installation and maintenance of the isolators and dampers. In many installations, the isolators are of a type in which the top plate is connected by a screw to a beam constructed into the inertia block. This type of isolator can be installed in unloaded condition and loaded by threading the screw to lift the inertia block off the foundation. In a system that has apparently been used in Europe, isolators constructed in a manner that permits them to be preloaded prior to installation under the inertia block and then partially unloaded by loosening the preloading bolts have been employed.

The damping systems that have been used in shock and vibration control systems for forging hammers have been of the type that inherently produce forces of magnitudes that vary in the course of operation of the system. One type of damping employs a mechanical snubber similar to snubbers used in the couplings between railway cars. The construction of such mechanical snubbers is such that the forces that they produce increase as a function of the extent of compression, and mechanical snubbers are subject to failure under certain conditions, for example, because of the buildup of an excessive vertical or horizontal force. Hydraulic-type snubbers have also been used, but it is well known that the seals required to contain hydraulic fluid frequently fail and require excessive maintenance and result in costly shutdown time. Moreover, the force output of hydraulic-type dampers is dependent on the velocity of the vibrating equipment at any given point in time; accordingly, the damping forces are low just after impact of the hammer, increase to effective levels only after the load has developed some velocity, and then decrease as the load is decelerated toward the end of one-half cycle of vibration. Accordingly, hydraulic dampers work effectively only during part of each cycle of vibration, and from this point of view, hydraulic dampers are inefficient.

In recent years, the tendency has been toward the use of forging hammers of extremely large size and involving tremendous impact loads, and the greater size and consequent heavy static loads and, of course, the greater impact forces have increased the problems in providing effective shock and vibration control. The heavy loads and tremendous impacts involved require a very large number of isolators and highly reliable damping, particularly when the hammer is designed for relatively high production rates in terms of operations per minute. Vibration must be damped as rapidly as possible using highly reliable dampers. The heavy static loads of the equipment have increased the difficulties involved in construction and installation of the hammer and have, in some of the very large installations, made systems based on known technology extremely expensive.

SUMMARY OF THE INVENTION

There is provided, in accordance with the invention, a greatly improved shock and vibration control system for forging hammers that overcomes many of the problems and limitations of previously known systems and offers important advantages and economies.

One aspect of the invention concerns the use of isolators having integral spring-loaded, adjustable friction-type damping systems. At least some of the great number of isolators of the system include, more particularly, a pair of horizontal, spaced-apart plates that extend down in parallel vertical planes from the underside of the top plate, each of which is engaged by a brake shoe that is spring loaded to develop a predetermined friction force between the brake shoe and the vertical plate. Each braking shoe is restrained by a housing from moving vertically or horizontally parallel to the plane of the plate. Accordingly, movement of the top plate of the isolator vertically or horizontally parallel to the planes of the plate is resisted by frictional force developed by the brake shoes and the vertical plates. The loading of the brake shoes can be adjusted by shimming to provide the desired damping forces, and the spring-loading of the brake shoes produces automatic adjustment to compensate for wear.

The shock and vibration control system, according to the invention, employs at least two of the above-described type of isolators oriented to provide damping of horizontal vibration (should such vibration occur) of the inertia block and hammer along one axis and at least two other such isolators oriented to damp horizontal vibration along an axis perpendicular to the aforementioned axis. Thus, the system provides for damping of any horizontal vibration that might occur along mutually perpendicular axes. It should be apparent that the springs that load the brakes of an isolator afford movement of the top plate of the isolator in a direction parallel to the axes of the brake loading springs. Energy-absorbing stops are provided in the isolators to restrict the extent of such movements.

In most systems, only a few of the many isolators are of the type having friction damping devices; the remaining isolators, usually by far the major proportion of the total number, are simple spring isolators having no damping and no loading devices. Both types are known per se, but neither type has, as far as is known, been used in shock and vibration control systems for forging hammers.

Another aspect of the invention involves the method of installing the system and the construction of the foundation that is ancillary to the method. The inertia block on which the hammer is mounted is a massive structure, usually made of reinforced or prestressed concrete. (The inertia block is often considered as part of the foundation for the forging hammer, and it is part of the shock and vibration control system for the hammer, but in the terminology employed herein, it is referred to as the "inertia block," and the term "foundation" is used to refer to the structural base member on which the inertia block and forging hammer are mounted, the isolators being interposed between the inertia block and the foundation.)

With extremely large forging hammers, the inertia block of the system may weigh as much as 1 million pounds or more, and it is quite apparent that the inertia block must, because of its size and weight, be fabricated in place on the foundation. In accordance with the present invention, the inertia block is fabricated in place on a multiplicity of spaced-apart load-bearing piers which are preferably constructed as part of the foundation. The height of the piers is such that the bottom of the inertia block is located at a distance X above the surfaces on which the isolators are mounted, the distance X being established with a definite relation to the unloaded and the loaded heights of the isolators and the minimum height of a jack used to load the isolators in place. In particular, the distance of dimension X is equal to the sum of (1) the loaded height of the isolators and (2) the height S of structural spacers that are installed between the top plates of the isolators and the bottom of the inertia block. The structural spacers, in turn, have a height S that is not less than, and preferably slightly greater than, the sum of (1) the difference between the unloaded height and the loaded height of the isolators and (2) the minimum height of the jack.

The reason for the dimensional relationships described above is that such dimensional relationships permit the isolators to be inserted in unloaded condition while the inertia block and the hammer are supported on the piers. The procedure for installing each isolator is as follows: First, the isolator, in unloaded condition (a condition in which the height of the isolator is, of course, somewhat greater than the loaded height) is placed in proper position on the foundation under the inertia block. A jack, preferably a hydraulic jack, is then inserted between the top plate of the isolator and the bottom of the inertia block and is operated to load the isolator to an extent sufficient to permit one or more permanent load-bearing spacers to be installed between the top plate of the isolator and the bottom of the inertia block. The jack is then lowered and removed. After all of the isolators have been so installed, the loads of the inertia block and hammer will have been transferred from the piers to the isolators. The piers or parts of the piers can then be removed to provide sufficient clearance to permit normal vibration of the inertia block and hammer on the isolators. An economical and reliable pier may, as described below, consist of a concrete pier, the top of which is spaced from the bottom of the inertia block by a distance greater than the distance that the inertia block moves down in operation of the hammer (thus permitting controlled vibration of the inertia block and hammer) and a removable temporary spacer plate mounted on top of the concrete pier. After the isolators are installed, the spacer plates are removed.

For a better understanding of the invention, reference may be made to the following description of an exemplary embodiment, considered in conjunction with the accompanying drawings.

DESCRIPTION OF EXEMPLARY EMBODIMENTS

Figure 1:
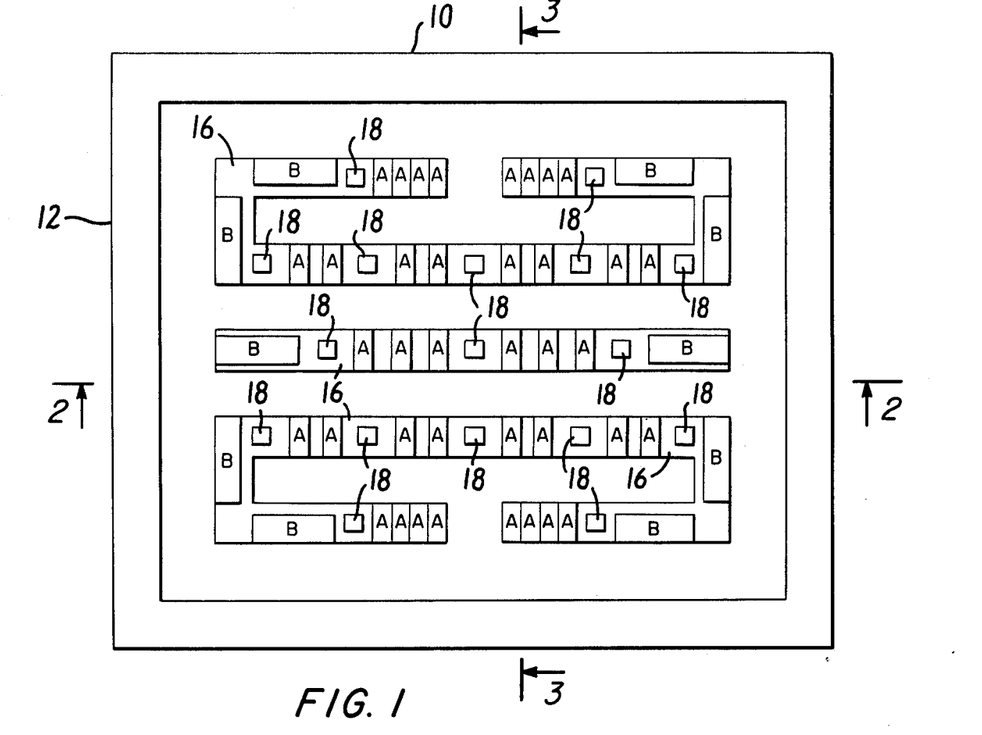
FIG. 1 is a plan view of the foundation on which the isolators, inertia block and forging hammer are mounted, the positions of the isolators and the types of isolators being represented by boxes bearing labels.
Figure 2:
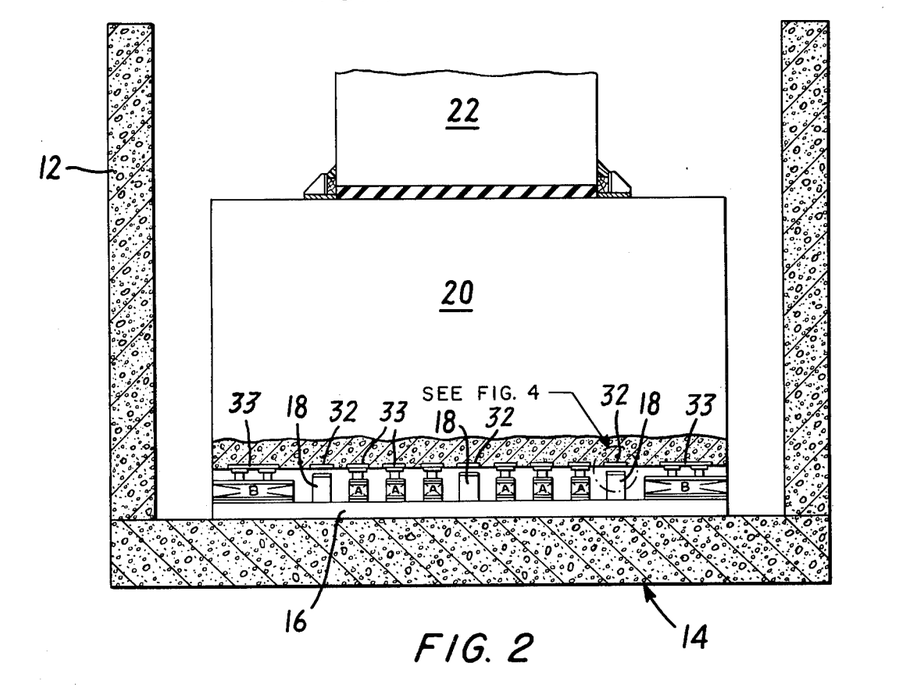
FIG. 2 is a side view in cross-section of the foundation taken generally along the lines 2—2 of FIG. 1 and in the direction of the arrows and showing the shock and vibration control system, the inertia block and, schematically, the lower part of the hammer.
Figures 3, 4:
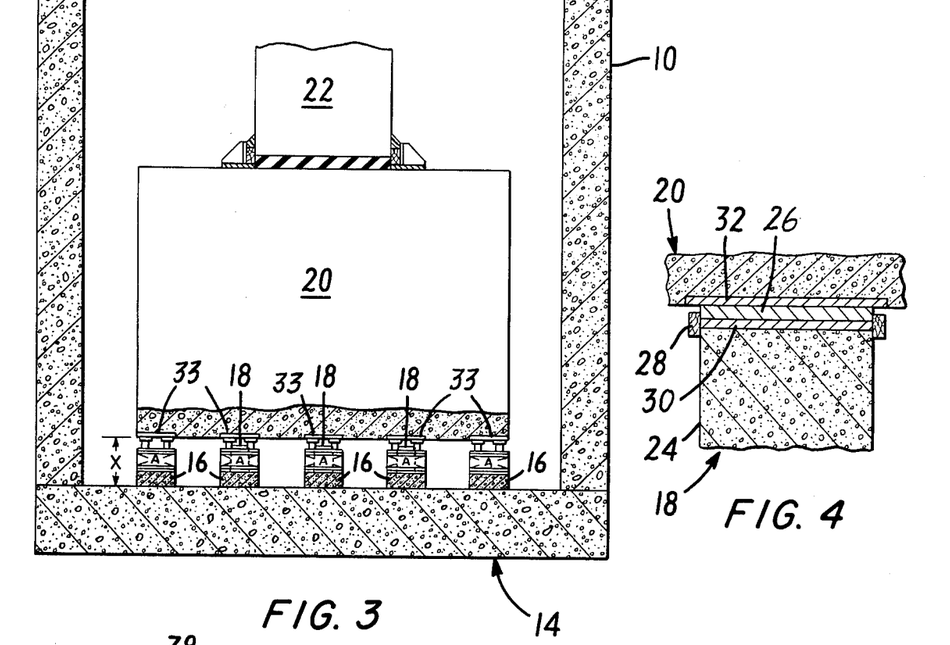
FIG. 3 is an end view in cross-section taken generally along the lines 3—3 of FIG. 2 and in the direction of the arrows.
FIG. 4 is a fragmentary view in elevation of one of the piers, the view being on a larger scale than in FIG. 3 and showing in greater detail the structure within the circle labelled 4 in FIG. 2.

As shown in FIGS. 1 through 3, a typical forging hammer installation embodying the invention includes a pit having side walls 10, end walls 12 and a base or foundation 14 on which are located structural pedestals 16, the upper surfaces of which constitute horizontal isolator-mounting surfaces of the foundation. The placement, dimensioning and structure of the pedestals will be such that they will support in desired locations, as indicated by the boxes bearing letter legends in FIG. 1, vibration isolators. As described in more detail below, the system shown in the drawings involves the use of two types of isolators that, for convenience, are referred to herein as "type A isolators" and "type B isolators." The type A isolators are positioned on the pedestals in the locations represented by the boxes labelled A, in FIG. 1, and the type B isolators are positioned in the locations indicated in FIG. 1 by the boxes labelled B.

The foundation 14 of the pit for the forging hammer installation shown in the drawings further includes a number of spaced-apart piers 18, one of which is shown in detail in FIG. 4. The piers are constructed and arranged to provide temporary support for the loads of the inertia block 20 and forging hammer 22 during fabrication of the inertia block and installation of the forging hammer. In the exemplary embodiment, as shown in FIG. 4, each pier includes a base portion 24, which may be of reinforced concrete or structural steel; the portion 24 constitutes the major part of the height of the pier. The pier also includes a removable, temporary spacer plate 26 held in position by a temporary peripheral frame 28. The inertia block, which is made of reinforced concrete, prestressed concrete, or post-stressed concrete, is fabricated in place by conventional construction techniques involving constructing temporary forms supported by erection shoring and the piers 18, placing the reinforcing and pouring the concrete. In reinforced concrete constructions, bearing plates 30 and 32 are installed in the forms for the pier and the inertia block and cast in place at each pier location. Bearing plates 33 (see FIGS. 2 and 3) are cast in place on the bottom of the inertia block at each isolator location. After the inertia block has been poured and has set to the strength necessary to support the forging hammer, the forms and erection shoring are removed and the forging hammer 22 is installed. From this point, the loads of the inertia block 20 and the forging hammer are supported by the piers 18.

The installation of the shock and vibration control system requires having access to the space under the inertia block to permit the isolators physically to be moved in under the inertia block, inserted in proper position, as indicated in FIG. 1, and loaded. Accordingly, it is preferable for the pedestals to be spaced apart and to have a height such that, when added to the height of the isolators and spacers (described below), there is enough room for workmen to move about.

Figure 5A:
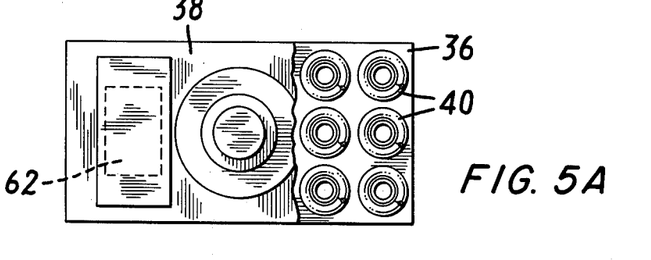
FIG. 5A is a top view of a type A isolator, part of the top plate being broken away.
Figure 5B:
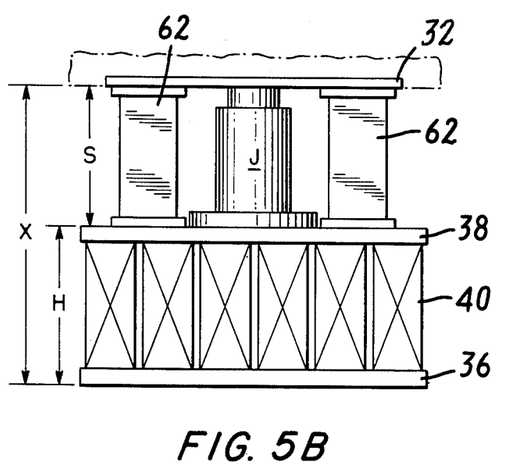
FIG. 5B is an elevational view of a type A isolator and the permanent spacers and also shows a jack in place for loading the isolator.
Figure 5C:
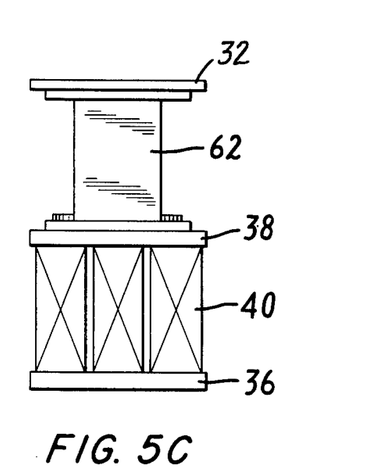
FIG. 5C is an end view of a type A isolator with spacers in place.

Referring now to FIGS. 5A to 5C, each type A isolator consists of a base plate 36, the bottom of which is provided with a non-skid pad (not shown), a top plate 38 and a number of springs 40. The details of the couplings between the springs and the plates are omitted in the drawing, the drawings showing the springs in schematic form, but it will be understood by those skilled in the art that suitable spring retainers are provided to maintain each spring in proper position between the plates 36 and 38.

Figure 6A:
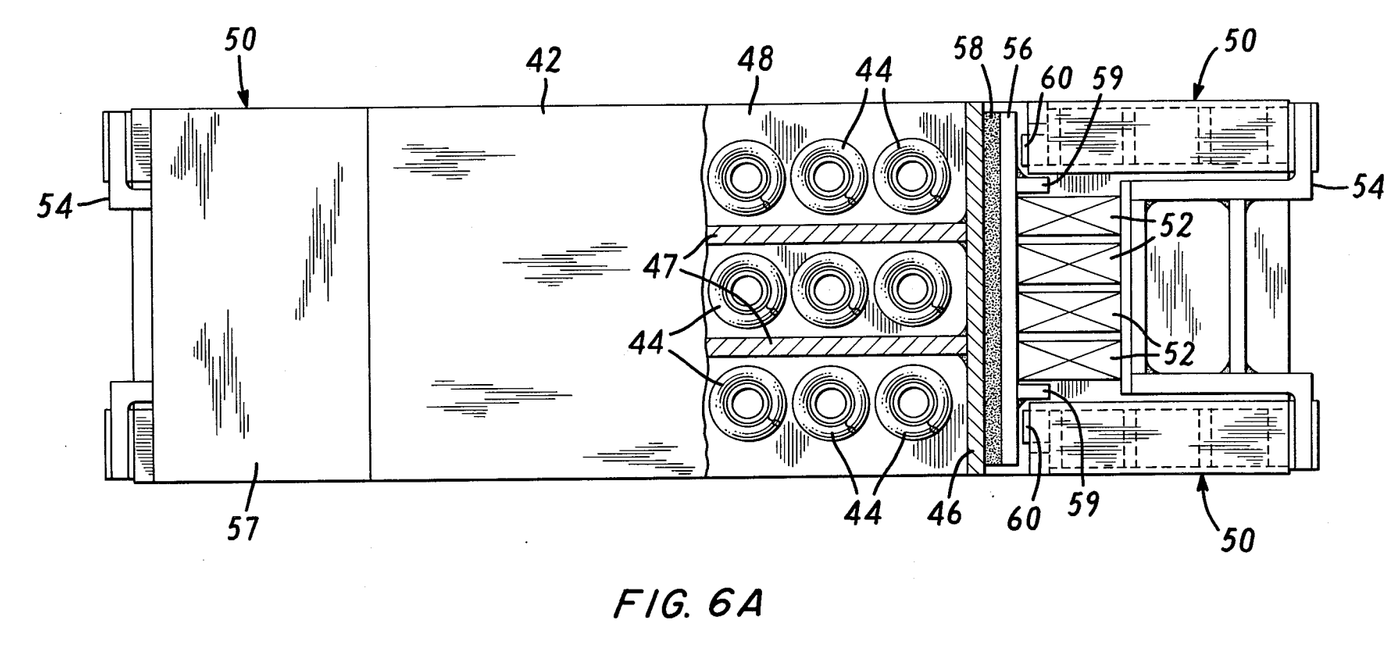
FIG. 6A is a top view of a type B isolator, the top plate being partly broken away.
Figure 6B:
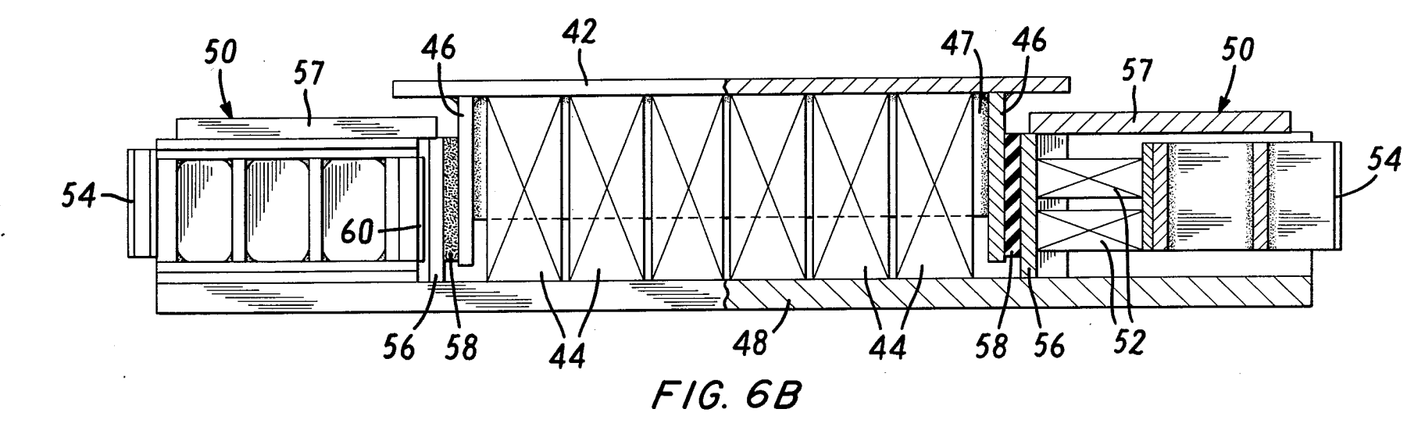
FIG. 6B is a side elevational view of the type B isolator.
Figure 6C:
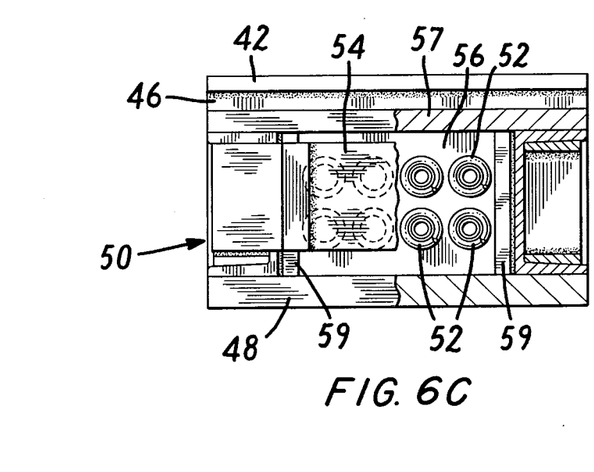
FIG. 6C is an end view of the type B isolator, part of the brake-spring retainer being broken away.

Each type B isolator (FIGS. 6A to 6C) has a top plate 42 that is supported on a large number of springs 44 and has a pair of vertical parallel brake plates 46 extending down from the underside, one at each end outwardly of the cluster of springs. Stiffener plates 47 extend lengthwise between the rows of springs to stiffen the two brake plates 46 and the top plate 42. The base plate 48 extends some distance out beyond each of the brake plates 46, and a strong housing 50 is fastened to the base plate 48 at each end portion. Within each housing are several brake springs 52 that are compressed between a retainer 54 and a brake shoe assembly, which consists of a back-up plate 56 and a brake shoe element 58, bolted to the back-up plate, and urge the brake shoe element 58 against the corresponding brake plate 46, thereby to generate substantially constant friction damping forces acting between the base and the top plate of the isolator. The spring force can be adjusted by using suitable shims between the retainer 54 and the housing 50. Each back-up plate 56 is captured between the base plate 48 and the top member 57 of the housing 50, thus preventing vertical movement of the friction brake shoe 58, and lateral retainer ribs 59 extend back between the interior side walls of the housing of each brake assembly, thus preventing horizontal movement of the brake shoe 58 relative to the housing 50. Accordingly, vibration of the inertia block and hammer and the consequent movement of the brake plates on the top plate of the isolator is resisted by frictional damping forces acting vertically and horizontally parallel to the brake plates.

As can be observed in FIG. 1, even numbers of type B isolators are mounted symmetrically with their longer axes aligned parallel to the end walls 12 of the pit, and even numbers of the type B isolators are mounted symmetrically with their longer axes parallel to the side walls 10 of the pit. In other words, even numbers of type B isolators are oriented to provide symmetrical damping forces parallel to mutually perpendicular, horizontal axes.

Both the type A and type B isolators are constructed to permit not only vertical vibration, but horizontal vibration, and the damping assemblies of the type B isolators are constructed and oriented to provide damping forces to dampen horizontal components of vibration of the inertia block and hammer. Each type B vibration isolator includes, however, energy-absorbing stops 60 (see FIG. 6A) that limit the extent or horizontal vibration, such stops 60 being positioned to be engaged by the back face of the corresponding back-up plate 56.

All of the isolators of the shock and vibration control system (i.e., both the type A and type B) are installed in accordance with the same procedure as follows: recalling that the inertia block and forging hammer are firmly and reliably supported by the piers 18 of the foundation, each isolator is moved through a suitable one of the access passageways between the pedestals and is placed in proper position on the pedestal. A jack is then moved in through an appropriate passageway and positioned on top of the top plate. At this point, the isolator is in an unloaded condition, which means that its height will be greater than its height will be when it is loaded. Using the jack, the isolator is loaded, that procedure involving, of course, the application by the jack of a force acting between the bottom of the inertia block and the top plate of the isolator that forces the top plate down and compresses the springs.

The loaded height of the isolator and the operating load in static condition of the isolator are, of course, known in advance. Thus, the measured distance between the bottom of the inertia block and the top of the top plate and the force applied to the jack will both be available ways to determine when the desired load condition has been reached.

In practice, the jack will be used to load the isolator to an extent slightly above the static load that it will carry in the final installation, thereby to move the top plate to a position a little bit below that which it will occupy at the best position when installed. The reason for that is to provide enough clearance to allow spacers 62 (see FIGS. 5A to 5C) to be moved into place between the top plate 38 or 42 and the bottom of the inertia block, the spacers being permanent load-bearing elements of the system. After the spacers are in place, the jack is lowered and removed. (Among the details now shown in the drawings are anchor bolts for securing the base plates 48 of the type B isolators to the tops of the pedestals. All of the spacers 62 are bolted to the bearing plates 33 on the bottom of the inertia block and to the top plates of all isolators to ensure against movement in the operation of the system.)

Referring to FIG. 5B, the dimension between the bearing plates on the pedestals and the bearing plates on the inertia block at each isolator location (the dimension labelled X in FIG. 5B) is, of course, equal to the sum of the loaded height H of the isolator and the height S of the spacers 62. The height of the spacers S must be not less than the sum of (1) the difference between the unloaded height of the isolators and the loaded height of the isolators and (2) the minimum height of a jack (item J in FIG. 5B) capable of applying the necessary load to the isolator. Stated more simply, the dimension X is established to permit an unloaded isolator to be placed on the pedestal and a suitable jack to be inserted between the top plate of the isolator and the bottom of the inertia block. The known dimension X and the loaded dimension H of the isolator will then determine the height S of the stops.

The heights of the piers, including the temporary spacers, will be established such that when all of the isolators have been installed in the manner described above, the load of the inertia block and hammer will be carried substantially entirely by the isolators, thereby permitting the temporary spacer plates 26 to be readily removed. To put it another way, after all of the isolators are installed, the piers should not support loads that will make it difficult to remove the spacers. The thickness of the temporary spacers 26 is in excess of the amplitude, i.e., of one half of the maximum movements of vertical vibration of the inertia block and hammer on the system. Thus, when the spacers are removed from the piers, normal vertical vibration of the shock and vibration isolation system is accommodated because the tops of the permanent piers 18 (which are preferably left in place) are below the lowest point of movement of the inertia block.

Should it be necessary to remove any of the isolators for any reason, such as to replace the brake shoes or, eventually, springs, the procedure described above for installing the isolator can be reversed. Indeed it is desirable as a matter of normal maintenance for the entire procedure of installing the isolation system to be used in reverse to again support the inertia block and hammer on the piers for replacement of the brake shoes and any other necessary maintenance of all of the isolators.

In the operation of the shock and vibration control system, it is, per se, well known, the isolators transform the impact force of the hammer to a smaller, gradually applied force. In addition, however, vertical and horizontal components of vibration generated upon impact of the hammer are rapidly damped by substantially constant forces generated by the friction dampers of the the type B isolators used in the system. A system, according to the invention, can thus be constructed more efficiently and reliably to dampen substantially all vibration of the inertia block and hammer between cycles of operation. The installation procedure, according to the invention, offers substantial benefits in terms of cost and ease of fabrication and installation of the forging hammer isolation system and, therefore, of relatively low initial cost of the job.

I claim:

1. A shock and vibration control system for a forging hammer comprising an inertia block having the forging hammer mounted thereon, a foundation including isolator-supporting portions located under the inertia block and having horizontal upper surfaces located a distance X below the bottom of the inertia block, a multiplicity of shock and vibration isolators supported on said surfaces, at least one of the isolators including friction damper means for damping vertical vibration and vibration in a first horizontal direction of the inertia block and at least one other of the isolators including friction dampers for damping vertical vibration and vibration in a second horizontal direction perpendicular to the first direction of the inertia block, and at least one structural spacer interposed between each of the isolators and the inertia block for load support of the inertia block and forging hammer on the isolators, each spacer having a height S substantially equal to the difference between the distance X and the loaded height H of the isolator and the height S of each spacer being greater than the sum of (1) the difference between the unloaded height of the isolator and the loaded height and (2) the minimum height of a jack adapted to load the isolator in place under the inertia block, the aforesaid dimensions and dimensional relationships between the dimensions X, S and H permitting each isolator to be inserted in unloaded condition under the inertia block and to be loaded by a jack and the spacers then inserted between the loaded isolator and the inertia block.

2. A shock and vibration control system according to claim 1, wherein said support portions are spaced apart by distances sufficient to permit the vibration isolators to be inserted while the inertia block and forging hammer are temporarily supported by rigid temporary structural supports.

3. A shock and vibration control system according to claim 1, wherein the isolator-supporting portions of the foundation are spaced-apart pedestals, the upper surfaces of which are located substantially above the floor of the foundation, the horizontal spacings between pedestals and the vertical clearance between portions of the foundation floor between the pedestals and the bottom of the inertia block being sufficient to permit insertion of the isolators while the inertia block and forging hammer are supported on rigid temporary structural supports.

4. A shock and vibration control system according to claim 3, wherein said vertical clearance and said spacings between the pedestals are large enough to afford physical access to all of the isolators by a workman.

5. A method of constructing a shock and vibration control system for a forging hammer mounted on an inertia block which is, in turn, mounted on a foundation comprising the steps of fabricating the inertia block in place at a vertical height X above isolator-supporting portions of the foundation under the inertia block, supporting the inertia block on rigid temporary structural supports at said height X, inserting a shock and vibration isolator in unloaded condition under the inertia block and in position on the isolator-supporting portion of the foundation, loading the vibration isolator by inserting a jack between the top of the isolator and the bottom of the inertia block and operating the jack to load the isolator, and inserting at least one permanent structural spacer between the isolator and the inertia block, the spacer having a height S substantially equal to the difference between the height X and the loaded height H of the isolator and the height S of the spacer being greater than the sum of (1) the difference between the unloaded height of the isolator and the loaded height of the isolator and (2) the minimum height of the jack.

6. A method of constructing a shock and vibration control system for a forging hammer comprising the steps of constructing a foundation having a multiplicity of spaced-apart rigid structural piers, a portion of each of which is removable, fabricating in inertia block in place on the piers at a height X above isolator-supporting portions of the foundation under the inertia block, installing the forging hammer on the inertia block, installing a multiplicity of shock and vibration isolators between the foundation and the bottom of the inertia block, each isolator being installed by (1) inserting the isolator in unloaded condition in place on a selected isolator-supporting portion of the foundation; (2) loading the isolator by inserting a jack between the top of the isolator and the bottom of the inertia block and operating it to load the isolator such that its height is not greater than its loaded height; (3) inserting at least one structural spacer between the top of the isolator and the bottom of the inertia block, the height S of the spacer being (1) equal to the difference between the dimension X and the loaded height H of the isolator and (2) greater than the sum of (a) the difference between the loaded and unloaded heights of the isolator, and (b) the minimum height of the jack, and (4) unloading the jack and removing it, and at such time as the load of the inertia block and forging hammer on a given pier is transferred substantially to the isolators, removing the removable portion of such pier.

7. A foundation constructed in preparation for subsequently installing an inertia block on the foundation and a forging hammer on the inertia block and thereafter installing a shock and vibration control system comprising as at least part of the foundation a structural base, a multiplicity of pedestals on the base having horizontal top surfaces adapted to support shock and vibration isolators, and a multiplicity of spaced-apart rigid structural load-bearing piers on the base and adapted to support the inertia block and forging hammer during installation thereof, each pier including a removable portion, the heights of the piers being such that the bottom of the inertia block is spaced a distance X above the top surfaces of the pedestals, the distance X being equal to the sum of the loaded height H of a shock and vibration isolator to be installed later and the height S of a permanent load-bearing spacer to be installed later between the top of the isolator and the bottom of the inertia block, and the height S being greater than the sum of (1) the difference between the unloaded height and the loaded height of the isolator and (2) the minimum height of a jack suitable for use in loading the isolator in place under the inertia block under later installation thereof.

8. A shock and vibration control system for supporting an inertia block and a forging hammer mounted on the inertia block on a foundation, comprising an even number in excess of two shock and vibration isolators installed on the foundation under the inertia block and supporting at least part of the load of the inertia block and forging hammer, all of said isolators including friction dampers for damping vertical vibration and unidirectional horizontal vibration by imposing substantially constant damping forces vertically and horizontally on the inertia block, at least two of the isolators being oriented to impose the horizontal damping forces thereof in one horizontal direction and at least two of the isolators being oriented to impose the horizontal damping forces thereof in a direction perpendicular to the first direction.

* * * * *

UNITED STATES PATENT AND TRADEMARK OFFICE
CERTIFICATE OF CORRECTION

PATENT NO. : 4,048,842

DATED : Sept. 20, 1977

INVENTOR(S) : Paul Baratoff

It is certified that error appears in the above-identified patent and that said Letters Patent are hereby corrected as shown below:

Column 3, line 30, "of" should be --or--; Column 6, line 15, "or" should be --of--; line 46, "best" should be --rest--; line 53, "now" should be --not--; Column 7, line 36, "it" should be --as--; Column 8, line 60, "in" (first instance) should be --an--; and Column 10, line 10, "under" (second instance) should be --upon--.

Signed and Sealed this

Seventh Day of February 1978

[SEAL]

Attest:

RUTH C. MASON
*Attesting Officer*

LUTRELLE F. PARKER
*Acting Commissioner of Patents and Trademarks*